May 24, 1966  J. D. TENNISON, JR  3,252,288
TELESCOPIC GUTTER JOINT
Filed Feb. 14, 1962
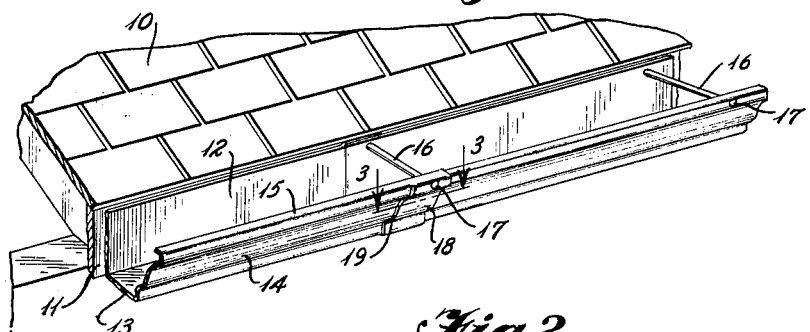
Fig. 1
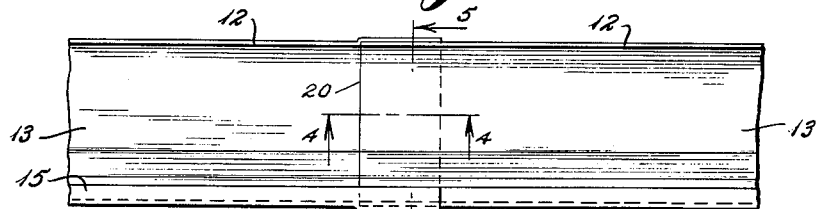
Fig. 2
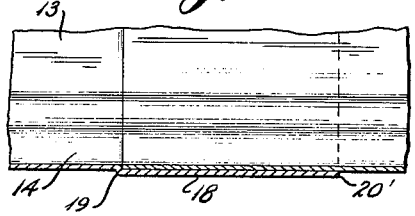
Fig. 3
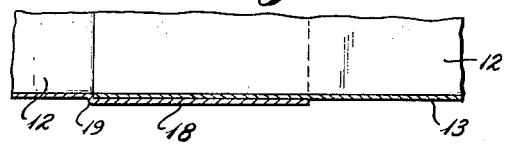
Fig. 4
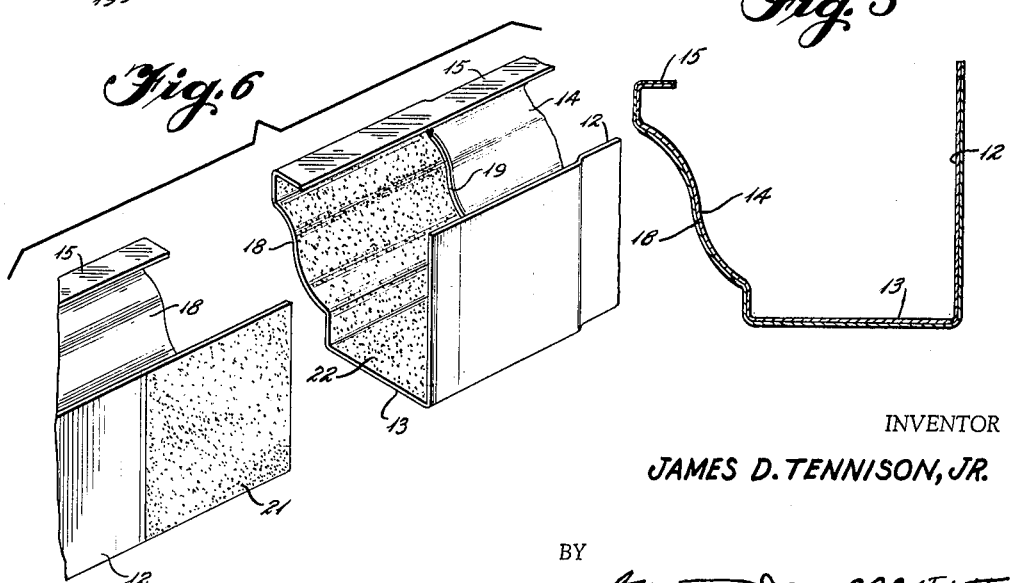
Fig. 5
Fig. 6
INVENTOR
JAMES D. TENNISON, JR.
BY
ATTORNEY United States Patent Office 3,252,288
Patented May 24, 1966

3,252,288
TELESCOPIC GUTTER JOINT
James D. Tennison, Jr., P.O. Box 8126, Memphis, Tenn.
Filed Feb. 14, 1962, Ser. No. 173,292
1 Claim. (Cl. 61—15)

This invention relates to the construction of buildings of various kinds and to the materials and equipment employed including the provision of the necessary facilities for protecting and taking care of various weather conditions.

The invention relates particularly to the exterior of buildings including the gutters by which water, from the rain and other weather conditions, is discharged through the drainage system without the retention of any of the same at various joints and other locations.

Gutters have been produced of various kinds, configurations, and materials, and have been installed in a manner that they included joints of various kinds and some of which overlapped but many of which retained sufficient water or moisture to promote rapid corrosion and deterioration. Raised joints which serve to obstruct flow have been produced in gutters by the use of solder causing raised beds or ridges. Also overlapped joints in gutters have been prevented from being tight by the presence of fine particles such as dust from the air, particles from the roof or adhering to the surface of the guttering or to the soles of the shoes of workmen or the like, and with sufficient accumulation to maintain the joint susceptible to holding moisture.

It is an object of the invention to overcome the difficulties enumerated and to provide guttering with a telescopic joint and a smooth inside surface or interior permitting complete drainage, thus avoiding small pools of water settling and remaining in the bottom of the gutter to cause accelerated corrosion and deterioration.

Another object of the invention is to provide an improved gutter joint which can be produced more quickly and which may be soldered or not as desired.

Other objects and advantages of the invention will be apparent from the following description taken in conjunction with the accompanying drawing wherein:

FIG. 1 is a fragmentary perspective illustrating the use of the invention in connection with a roof;

FIG. 2, a top plan of a gutter joint;

FIG. 3, a section through the side on the line 3—3 of FIG. 1;

FIG. 4, a section through the bottom on the line 4—4 of FIG. 2;

FIG. 5, an enlarged section on the line 5—5 of FIG. 2, and

FIG. 6, an exploded perspective illustrating one modification of the invention.

Briefly stated, the gutter of the present invention is produced by joining multiple lengths of gutter-forming open top trough or channel members end to end in overlapping relation with the end portion of one member receiving and the end portion of the other member received. An offset is provided in the receiving member of a thickness of the received member and in which receiving member the extremity of the received member is located, thus providing a smooth interior surface along which water can flow without obstruction. Each of the lengths of the open top trough or channel member has an inturned substantially horizontal flange so that the received member is resiliently retained in the receiving member. The telescoped members are fastened together in any desired manner.

With continued reference to the drawing, the invention is applied to a shingle roof 10 which terminates in an eave plate 11 at its lower extremity to which the guttering is attached. The guttering is composed of multiple lengths each having an upright rear wall 12, a substantially horizontal bottom wall 13 connected to the rear wall substantially at a right angle, and an outwardly inclined corrugated outer front wall 14 with an inturned flange 15.

The guttering may be provided with spacer sleeves 16 through which fasteners 17 are applied along the length of the gutter including at the joints between lengths of guttering.

In forming the gutter the end in which the end of the adjacent gutter is received is provided with an enlarged portion 18, the transverse internal dimension of which corresponds to the external dimension of the received gutter. The receiving gutter has a shoulder 19 against which the end of the received gutter abuts and since the received gutter is of a thickness corresponding to that of the receiving gutter, a smooth interior will be provided.

If desired, the slight groove or crevice between the free end of the received gutter and the shoulder 19 of the receiving gutter may be filled with a waterproof material, as for example, a bead of solder 20. Such bead of solder must be smooth, retained entirely within the groove, and flush with at least the bottom walls 13 to maintain the smooth interior of the gutter and to preserve the waterproof integrity of the joint. Also a bead of solder 20' may be placed along the free end of the enlarged portion 18 to connect such free end to the received gutter.

In the joint thus produced the inturned flange 15 and the depending portion to which it is connected are not provided with the offset so that a relatively smooth upper surface is provided at the overlap of the flanges 15 since it is unnecessary to inset either the flanges 15; consequently there is a resilient connection with the extremity of the contained gutter accommodated by the resiliency of the uppermost flange 15 thus improving the tightness of the joint.

As illustrated in FIG. 6 the outer surface of the free end of the received gutter may be tinned or coated with solder 21 or the like and the cooperating inner surface of the enlarged portion 18 of the receiving gutter also may be tinned or coated with solder 22. When the contiguous surfaces are telescoped together at assembly, heat is applied to the joint to create a permanent waterproof bond between cooperating length of gutters.

It will be apparent from the foregoing that a relatively simple gutter is provided which may be manufactured in standard lengths. The lengths of gutter are shorter than the surface to which they are to be applied, and such lengths may be assembled in the field and when assembled will maintain a smooth inner surface to prevent the formation of pools of water or the collecting of foreign matter which tend to rust or promote rapid corrosion and deterioration of the gutter.

It will be obvious to those skilled in the art that various changes may be made in the invention without departing from the spirit and scope thereof and therefore the invention is not limited by that which is illustrated in the drawing and described in the specification, but only as indicated in the accompanying claim.

What is claimed is:

A drainage trough comprising multiple lengths of elongated sheet metal gutter members of similar cross section, each member having front, rear and bottom walls, said rear and bottom walls being connected generally at a right angle, an inwardly extending flange connected to the upper edge of said front wall substantially diametrically opposite said right angle, one end of each member having a longitudinally extending enlargement providing a shoulder, said enlargement being laterally spaced from said front, rear and bottom walls a distance corresponding to the thickness of the sheet metal and the flange of said enlargement being substantially planar with the remaining flange, the opposite end of each member being received within the enlargement of an adjoining member and engageable therewith throughout the length thereof, the free end of said opposite end abutting said shoulder, the flange of said enlargement resiliently engaging the flange of said opposite end, a bead of waterproof material filling the crevice between the free end of said opposite end and said shoulder to provide a smooth continuous waterproof joint flush with at least the bottom walls, whereby said enlargement of each member will resiliently hold the opposite end of an adjoining member and the cooperating right angle connections will prevent rotation to maintain said members in assembled relation.

References Cited by the Examiner

UNITED STATES PATENTS

| | | | |
|---|---|---|---|
| 326,647 | 9/1885 | Hardy | 61—15 |
| 539,797 | 5/1895 | Collins | 61—14 |
| 2,224,145 | 12/1940 | Dungan et al. | 29—502 |
| 2,639,680 | 5/1953 | Tennison | 61—15 |
| 2,647,476 | 8/1953 | Gibbons | 61—15 |
| 2,954,727 | 10/1960 | Katt et al. | |

FOREIGN PATENTS 841,369  7/1960  Great Britain.

EARL J. WITMER, *Primary Examiner.*